Dec. 15, 1964  J. M. CRINES  3,161,380
SLIDER FOR RETAINING AIRCRAFT LAUNCHING TOWLINES
Filed Oct. 24, 1963  2 Sheets-Sheet 2

INVENTOR.
JAMES M CRINES
BY
Arthur L. Collins
ATTORNEY

United States Patent Office 3,161,380
Patented Dec. 15, 1964

3,161,380
SLIDER FOR RETAINING AIRCRAFT
LAUNCHING TOWLINES
James M. Crimes, Philadelphia, Pa., assignor, by mesne assignments, to the United States of America as represented by the Secretary of the Navy
Filed Oct. 24, 1963, Ser. No. 318,770
6 Claims. (Cl. 244—63)

This invention relates to aircraft catapults and particularly to devices for restraining the towline.

In catapult launching devices, it is common to have a shuttle hook project above the take-off surface which is driven forward with firing of a catapult engine. The force of the engine is applied to the aircraft by a towline or bridle which is releasably coupled with the shuttle hook. After the aircraft is airborne, the towline or bridle is automatically disengaged from the aircraft. The shuttle hook and towline are then returned for subsequent launch.

In order to retain the tow line or bridle on the deck after a launching, in the invention, lanyards connect the bridle with sliders. Tracks guide the sliders to permit movement along the deck but prevent it from being hurled upwardly or off the deck. Since no one towline or bridle is of satisfactory length or strength for all types of aircraft, they must be changed to suit the aircraft being launched. Furthermore, the change must be performed quickly, for instance, in fourteen seconds. The construction of the sliders and lanyards in the invention permit such an achievement.

A clearer understanding and better appreciation of the invention will be obtained from the following detailed description when read in conjunction with the attached drawing, wherein.

Figure 1:
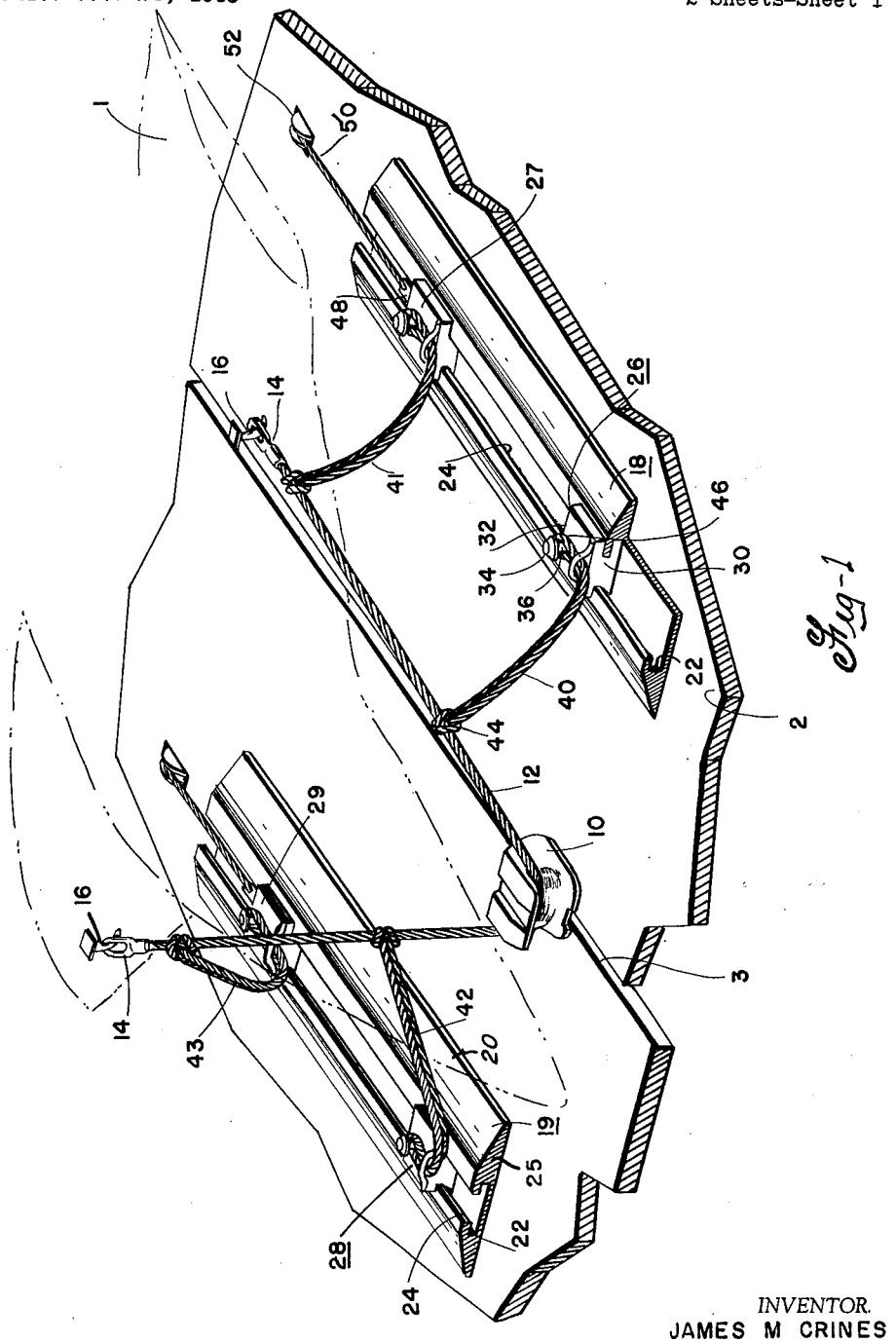
FIG. 1 is a perspective view showing the invention, portions of which are broken away, as used on a catapult equipped deck having an aircraft, in broken lines, connected for a launch.

Referring to the drawing, an aircraft, a portion of which is shown in dotted lines at 1, is positioned on a deck 2 having a longitudinal slot or track 3 in preparation for a catapult launch. Extending through the deck slot 3, there is a shuttle hook 10 which is connected to a shuttle mounted beneath the deck and driven by a catapult engine, not shown. A towline or bridle 12 releasably connects the aircraft to the shuttle hook 10. The ends of the bridle 12 have eyes 14 that engage rearwardly directed hooks, 16 and 16, projecting from the aircraft 1. The bight or center portion of the bridle 12 is looped over the forwardly directed shuttle hook.

In a launch, the power of the catapult engine is transmitted through the shuttle hook 10 and bridle 12 to the aircraft 1 to assist its movement in take-off. When the aircraft reaches take-off speed, it is moving faster than the shuttle hook 10 and pulls its hooks, 16 and 16, out of the bridle eyes, 14 and 14, severing its connection with the deck.

After a launch, the shuttle is halted. Because of the momentum, the bridle 12 continues to move ahead and disengages from the shuttle hook. To prevent loss of the bridle 12, i.e., going overboard, it is coupled to the deck 2 in a manner to allow it to move with the launch and yet it is restricted from leaving the deck for retrieval and subsequent launches. In the construction, there are a pair of parallel tracks, 18 and 19, disposed on the deck with the deck slot 3 between them. Each track, 18 or 19, is a metallic plate beveled, at 20, on its upper longitudinal edges, and has a rectangular, longitudinal cavity 22 connected by a longitudinal slot 24 of smaller cross-sectional area which penetrates the top 25.

A slider is mounted for movement in at least one of the tracks and in each track there are preferably two, 26 and 27 in track 18, and sliders 28 and 29 in track 19, as shown in FIG. 1. Each slider, as the one indicated at 26, has a metallic body 30 shaped like an H in cross-section that is disposed with one of its sides within the track cavity 22, and with the other side defining a top 32 above the track 18.

Secured, as by welds or other suitable means, not shown, to the slider top 32 at substantially its center there is an upstanding projection or horn 34 which is reduced at its center portion to form a groove, shown at 36. Forward of the horn 30, an inverted U-type bracket 38 is secured at its ends, as by welds not shown, to the top 32 of the slider 26.

Endless, flexible, inextensible members or lanyards, 40, 41, 42 and 43 connect the bridle 12 to the sliders 26, 27, 28 and 29, respectively. Each lanyard is preferably of nylon and is attached to the bridle 12 by wrapping an end portion, as the bight at 44 of lanyard 40, around the bridle and passing through it the other end, which is the bight or sling 46. The other end, bight 46, is joined to the slider by passing it into the bracket 38 from its forward side, raising it above the horn 34, expanding the size of the bight or sling and dropping it over the horn 34. A forward pull on the lanyard will cause the sling to contract and to seat in groove 36 of the horn where it will be held against disconnection from the horn by upward movement of the lanyard. To disconnect a lanyard, the reverse of the procedure is followed.

The forward lanyards, 40 and 42, are connected to the forward part of the bridle near its connection with the shuttle hook 10. The rearward lanyards, 41 and 43, are connected to the rearward part of the bridle near its connection with the aircraft's hooks, 16 and 16. The rearward sliders and lanyards are furnished to restrain the eye ends of the bridle 12. Often times after the aircraft being launched has pulled away from the bridle 12, as previously described, the underside of its tail section will be slapped by the rearward ends of the bridle 12. This is because, at this time, the launching shuttle is undergoing arrestment and the aircraft in pulling upward to leave the deck brings its tail section closer to the deck, the rearward ends of the bridle 12 are thrown forward into the aircraft away from the shuttle hook, as previously described, and the underside of the tail section will be slapped by the bridle ends. The rearward lanyards, 41 and 43, and sliders, 27 and 29, are provided to hold the rear portions of the bridle to the deck and to avoid this occurrence.

To return the bridle for another launch, one of the sliders, as that at 27, is provided with a ring 48 in its back side. A retrieving line 50 is connected at one end to the ring 48 which leads through the track cavity 22 rearwardly and passes over a pulley 52 at the end of the slider track 18 to a retraction engine, not shown, mounted below the deck. In a launch, the retrieving line 50 is fed from the retraction engine to permit the sliders and bridle to move forward. After a launch, the retraction engine pulls back the retrieving line 50 and it brings with it the bridle 12, the sliders, and the lanyards, since they are all connected together.

Figure 2:
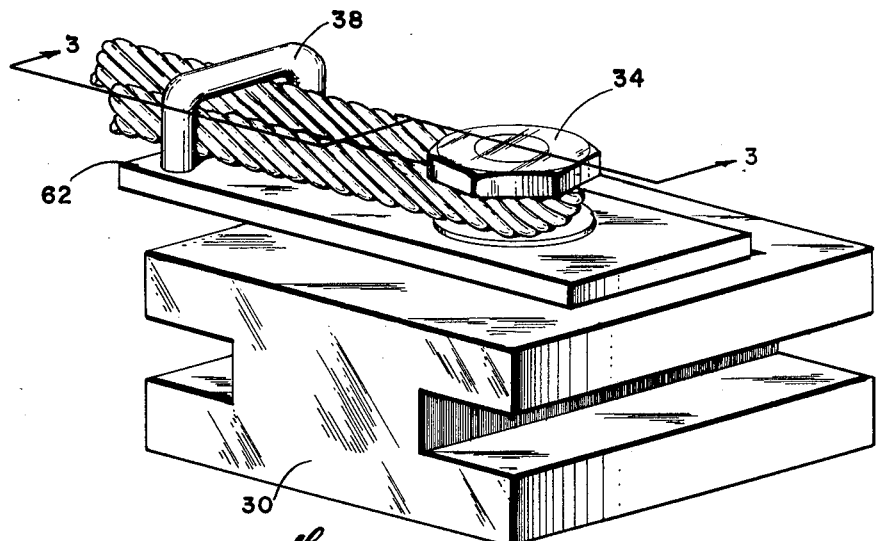
FIG. 2 is a perspective view showing a modification of a slider.
Figure 3:
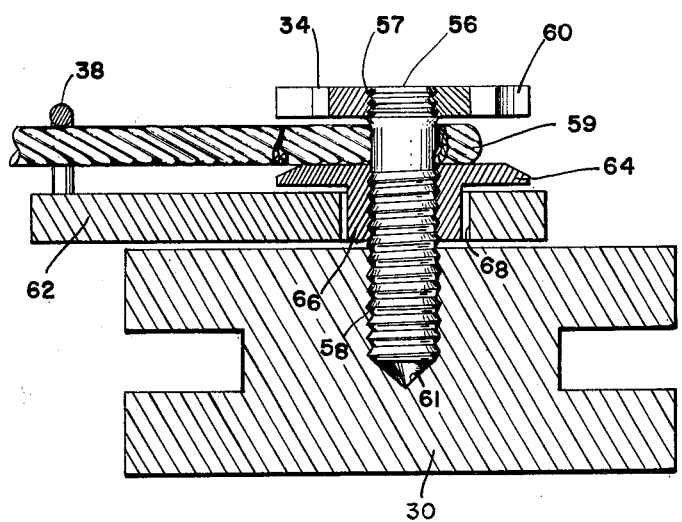
FIG. 3 is a cross-sectional view taken on line 3—3 of FIG. 2.

A modification of a slider is shown in FIGS. 2 and 3 in which the same numerals indicate similar parts of the sliders of FIG. 1. It will be noticed that the horn, 34, comprises a bolt like stem 56 which is threaded at both ends, 57 and 58, leaving an unthreaded portion 59 in-between. A nut 60 is screwed on the upper end 57 to provide a head, whereas the lower end 58 is turned into a threaded aperture 61 in the top of the slider body 30. The bracket, 34, is secured to the upper surface of a plate 62, instead of the slider body, which is swivelably mounted on the stem 56 under a flange 64. The flange 64 is threaded at the upper portion of the stem's lower end 58 and has an axially and downwardly directed flange or hub 66. The swivel plate 62 has an aperture 68 which receives the hub 66 of the flange 64 and is capable of being turned about without damage to the threads.

With this construction, damaged parts of a slider, as the horn 34, are easily replaced. Furthermore, attachment of a lanyard to a slider is performed as previously described, but is further enhanced, since the plate 62 with the bracket 38 may be turned toward the bridle to reduce the length required of a lanyard to reach from the bridle to the slider. This is particularly important when the aircraft has but one hook 16 to which both eye ends of a bridle are connected. All parts of the bridle are then substantially at equal distance from the slider tracks and since the lanyards are of equal length, and their length is such that when connected, there is little slack in them, the swiveling of plate 62 is advantageous in this environment.

The foregoing is considered as illustrative of the principles of the invention. Numerous modifications and changes will readily occur to those skilled in the art; therefore, it is intended that the invention be limited only as set forth in the appended claims.

What is claimed is:

1. A slider for coupling by a sling to a catapult towline for restriction thereof to a take-off surface having a track thereon comprising a body for slidable mounting in said track with the top surface accessibly exposed therefrom,
   a projection secured to said top surface adapted for towing engagement with said sling,
   and a bracket secured to said top surface forwardly of said projection having a passageway opening in the direction of launch permitting entrance therethrough of said sling for engagement with said projection.

2. A slider for coupling by a sling to a catapult tow line for restriction thereof to a take-off surface having a track thereon comprising a body for slidable mounting in said track with its top surface accessibly exposed therefrom,
   a horn including a stem threaded at its upper and lower end, said stem being threaded at its lower end into said top surface,
   a head nut threaded on the upper end of said stem,
   a plate swivelably mounted on said horn under said head nut, and
   a bracket secured to said plate having a passageway permitting entrance therethrough of said sling for looping on said horn.

3. The device of claim 2 including a nut threaded on the upper portion of said lower end of said stem for spacing said plate from said head nut.

4. In a catapult launching device having a shuttle hook mounted for movement in given directions and a towline releasably secured to an aircraft and said shuttle hook,
   a flexible, inextensible line secured at one end to said towline and having a sling at its other end,
   a slider having a body mounted for movement parallel to the movement of said shuttle hook,
   a projection extending upwardly from said body,
   a bracket secured to said body forwardly of said projection having a passageway opening in the direction of launch permitting entrance of said sling,
   said sling being removably secured by passage through said passageway and looping on said projection.

5. In a catapult launching device having a shuttle hook mounted for movement in given directions on a take-off surface and a tow line releasably secured to an aircraft and said shuttle hook,
   a lanyard releasably secured at one end to said tow line substantially near its securement to said shuttle hook and having a sling at the other end,
   a track secured to said take-off surface parallel to the movement of said shuttle hook,
   a slider having a body slidably mounted in said track with its top surface accessibly exposed therefrom,
   a horn secured to said top surface for towing engagement with said sling,
   a bracket secured to said top surface forwardly of said horn having a passageway,
   said sling being removably secured by passing thereof through said passageway and looping on said horn,
   a second lanyard secured at one end to said towline near its securement to said aircraft, and having a sling on the other end thereof,
   a second slider having a body slidably mounted in said track rearward of said first slider and having a top surface accessibly exposed therefrom,
   a second horn secured to said top surface of said second slider, and
   a bracket secured to said top surface of said second slider forwardly of its horn having a second passageway,
   said sling on said second lanyard being removably secured to said second slider by passing thereof through said second passageway and looping on said second horn.

6. The device of claim 5 wherein said first and second brackets are swivelably secured to said first and second sliders respectively.

References Cited by the Examiner
UNITED STATES PATENTS 2,523,314  9/50  Maxson _____ 244—63

MILTON BUCHLER, *Primary Examiner.*

ANDREW H. FARRELL, *Examiner.*